United States Patent [19]

Petersen

[11] 4,415,251

[45] Nov. 15, 1983

[54] CAMERA SHUTTER HAVING BOBBIN DRIVEN BLADES

[75] Inventor: Christian C. Petersen, Westwood, Mass.

[73] Assignee: Polaroid Corporation, Cambridge, Mass.

[21] Appl. No.: 341,555

[22] Filed: Jan. 21, 1982

[51] Int. Cl.³ .......................... G03B 9/08; G03B 9/30
[52] U.S. Cl. .................................. 354/230; 354/235; 354/241
[58] Field of Search .............. 354/227, 230, 234, 235, 354/271, 241, 242, 243, 244, 245, 246, 247, 248, 249, 50

[56] References Cited

U.S. PATENT DOCUMENTS

| | | | |
|---|---|---|---|
| 330,775 | 11/1885 | Damry et al. | 354/241 |
| 599,670 | 2/1898 | Harrison | 354/241 |
| 2,931,284 | 4/1960 | Vinten | 354/241 |
| 3,116,670 | 1/1964 | Ball | 354/50 |
| 3,191,515 | 6/1965 | Findlay | 354/241 |
| 3,762,295 | 10/1973 | Kital | 354/234 |
| 4,024,552 | 5/1977 | Kondo | 354/234 |
| 4,054,889 | 10/1977 | Tsujimoto | 354/230 |
| 4,060,313 | 11/1977 | Kondo | 354/234 |
| 4,072,965 | 2/1978 | Kondo | 354/234 |
| 4,121,235 | 10/1978 | Fujita et al. | 354/234 |
| 4,141,634 | 2/1979 | Inoue | 354/246 |
| 4,150,890 | 4/1979 | Nakagawa et al. | 354/246 |
| 4,171,897 | 10/1979 | Fujita et al. | 354/234 |

*Primary Examiner*—A. A. Mathews
*Attorney, Agent, or Firm*—David R. Thornton

[57] ABSTRACT

A light controlling system for photographic apparatus in which a pair of cooperating blades are defined by linear flights of a folded belt formed of an opaque film and having a central portion trained about a fixed axis guide roller with the free ends of the belt flights connected to reciprocable, coil carrying bobbins supported in a fixed armature frame. The bobbins are alternately driven in opposite directions to effect operative movement of the blades. An additional pair of bobbins may be supported on the frame for operating auxiliary driven components such as an adjustable aperture stop where the aforementioned belt provides simply shutter blades.

15 Claims, 5 Drawing Figures

CAMERA SHUTTER HAVING BOBBIN DRIVEN BLADES

BACKGROUND OF THE INVENTION

1. Field of the Invention

This invention relates to photographic apparatus and, more particularly, to electromagnetic driven light controlling components such as camera shutters, aperture stops and the like.

2. Prior Art

U.S. Pat. Nos. 4,024,552; 4,060,313; 4,072,965; 4,121,235; and 4,171,897 disclose shutter mechanisms for photographic cameras in which a pair of shutter blades are driven between positions representing a light blocking or closed condition and a light passing or open condition by forces developed between an electric current conducting coil and a permanent magnet. In the first three of these patents, the shutter blades are each driven in only one direction (shutter opening movement) by the electromagnetic force for return (shutter closing movement) to their initial position by spring means. In the latter two of the cited patents, shutter blade movement in both directions is by electromagnetic force, but the blades are mechanically interconnected by pivot linkage means so that movement of one blade in one direction will result in movement of the other blade in an opposite direction.

In shutter systems of the type represented by the disclosures of the cited patents, the ultimate accurate speed of shutter blade movement is dependent on the magnitude of force available in the electromagnetic driving device and the mass of all components which are moved by such force. In a linear electromagnetic motor of the type represented herein, the force is equal to the product of flux density (B), the length (L) of conductor in the flux path, the electric current (I) in the flux path, and the sine of the angle ($\theta$) between the conductor field and the magnetic field. Permanent magnets of rare earth materials such as samarium cobalt have been developed which provide high flux densities in a magnetic field effective at essentially right angles to the magnetic axis of the magnet (sine $\theta = 1$) particularly when two such magnets are spaced in an iron or otherwise magnetically permeable core with common poles of the two magnets facing each other. Either the coil or the armature in such a motor must be included in the movable components of the system. Because of the need for high density material in the armature and the correspondingly increased mass incident thereto, even in extremely small armature structures, movement of the coil is often preferred to movement of the armature. Such an arrangement is disclosed in U.S. Pat. No. 4,024,552. In this type of linear motor, an effective trade-off can be made in the length (L) of the conductor in the coil and in the size of the coil conductor needed to carry the current (I).

Other movable components in the present system such as the shutter blades themselves and related linkages for their actuation obviously should be kept as light as possible and incur a minimum amount of friction or other resistance to movement in order to minimize the electromagnetic force necessary for proper operation. Since low mass in movable shutter blades has always been an objective, the state of the art relating to shutter blades is presently highly refined. For example, shutter blades currently in use are approximately 150 microns in thickness and each weigh approximately 160 milligrams exclusive of drive mechanisms and linkages. These physical characteristics represent the approximate minimum mass attainable in present blades since sufficient rigidity is required to maintain structural conformation under the stress of compressive forces which are applied during shutter operations. However, prior disclosures such as those found in U.S. Pat. No. 330,775 issued Nov. 17, 1885 and U.S. Pat. No. 2,931,284 issued Apr. 5, 1960, suggest, respectively, double-ended or endless belt structures for shutters which are subjected only to tensile forces. These disclosures, however, do not suggest linear electromagnetic actuation nor minimized resistance to shutter component movement incident to such actuation.

SUMMARY OF THE PRESENT INVENTION

In accordance with the present invention, an exceedingly low inertia, high speed light controlling blade and drive system is provided in which a pair of physically linked blades are driven between open and closed conditions in both directions of travel by linear force developing electromagnetic motors in which the force/mass ratio is optimized. Where the light controlling blades are used as a camera shutter, and control over blade movement in both directions of travel is therefore critical, the blades are constituted as opposite apertured flights of a thin double-ended belt, the flights being linked to each other by a belt portion trained about a small diameter idler roller. The free ends of the flights are connected by tensile means respectively, to each of a pair of coil supporting bobbins movable in relation to a permanent magnetic field by current flow through the coils. The magnetic field is provided by a pair of parallel permanent magnet armatures arranged in an iron or otherwise magnetically permeable and closed frame in a manner to attain an extremely high flux density in a magnetic field at virtually right angles to the direction of bobbin or coil movement. Thus, by alternate energization of the bobbin coils, the blades constituted by the apertured flights in the double-ended belt are moved synchronously in opposite directions between light passing or open and light blocking or closed conditions.

The electromagnetic drive system may be modified to include an additional pair of independently controlled coil supporting bobbins for simultaneous or non-simultaneous operation of related driven components without adding significantly to the overall size of the drive system. This may be accomplished by incorporating an additional pair of bobbins on each outer frame leg. While the length of the conductor in the field of the added coils in the permanent magnetic flux path is reduced by one-half, thus reducing the electromagnetic force developed in the added bobbins, the characteristics of the previously mentioned two bobbins are retained. In a camera system having separate shutter and aperture stop mechanisms, for example, those mechanisms may be provided in separate double-ended belts where the belt flights defining the shutter blades are driven by connection to the originally provided bobbins as before. The belt flights defining the aperture stop mechanism would be connected to the added or outside bobbins, which though often developing a lower electromagnetic force, are more than adequate to supply the relatively reduced acceleration required of the aperture stop mechanism.

A primary object of the present invention is, therefore, the provision of an extremely low inertia light controlling blade and electromagnetic drive system which is highly effective in meeting the accurately controlled accelerating requirements of such systems, which may be arranged in extremely compact space and which is easily manufactured at low cost. Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENTS

Figure 1:
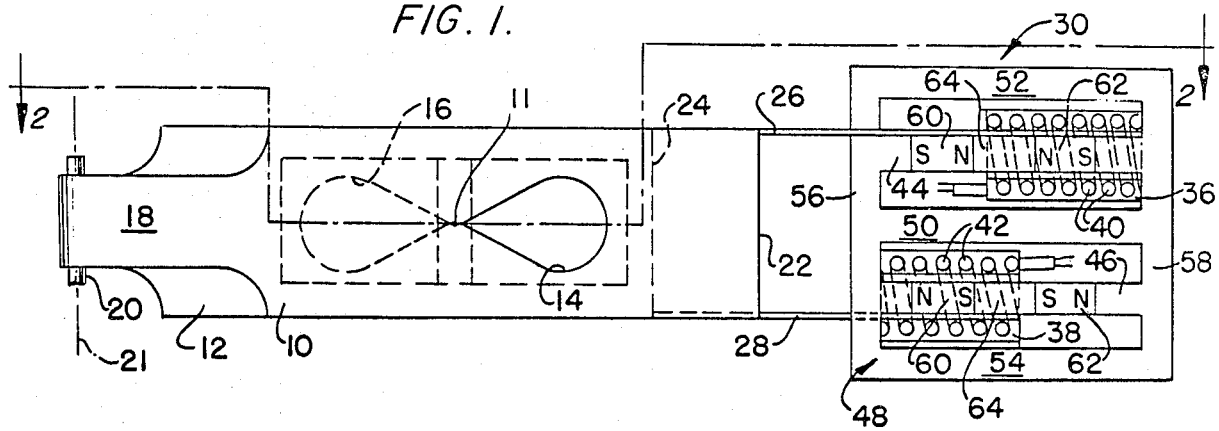
FIG. 1 is a partially schematic front elevation of a shutter system in accordance with the present invention.
Figure 2:
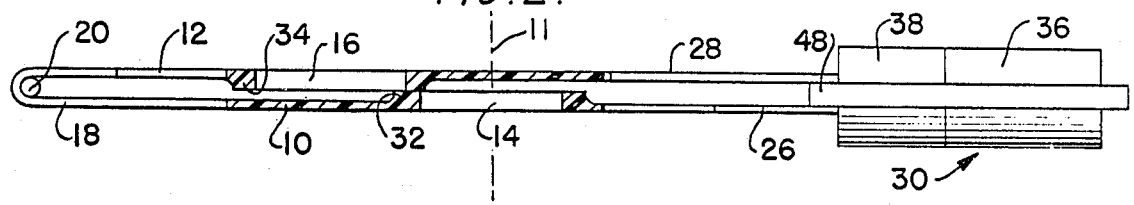
FIG. 2 is a top plan view in partial cross-section as seen on line 2—2 of FIG. 1.

In FIGS. 1 and 2 of the drawings, an embodiment of the present invention is shown to provide an integrated aperture stop/shutter mechanism or scanning shutter for use in photographic cameras. As in the prior art, the shutter includes a pair of blades 10 and 12 having respective tear-shaped apertures 14 and 16 oriented in a manner to be out of registry with each other for establishing a light blocking or closed condition at the camera exposure axis 11 with the blades 10 and 12 positioned as shown in FIGS. 1 and 2, but movable toward each other to provide increasing coincidence of the aperture 14 and 16 which define a progressively enlarging composite opening ultimately reaching a full open condition.

In the present invention, the blades 10 and 12 are formed as parallel flights of a double-ended belt having a central portion 18, of reduced width in the embodiment illustrated, which is trained about a small diameter idler roller 20 having a fixed axis 21. The free ends 22 and 24 of the flights defining the respective blades 10 and 12 are connected to and supported by tensile strands 26 and 28. The strands 26 and 28 extend to a linear motor drive system, generally designated by the reference numeral 30, which is spaced from the axis 21, and described in more detail below.

The belt defining the blades 10 and 12 as well as the interconnecting portion 18 is preferably formed from an opaque thin polyester film such as Mylar having a thickness of approximately 25 microns in the embodiment of FIGS. 1 and 2. The mutually facing surfaces of the blades 10 and 12 are retained in light sealing contact with each other by frame-like bosses 32 and 34 about the apertures 14 and 16, respectively. The light sealing frames or bosses compensate for the belt flight spacing as a result of the diameter of the idler roller 20 which may be kept extremely small, such as on the order of a millimeter. Thus, by virtue of the opaque or light blocking nature of the blades 10 and 12, and the light seal provided by the frame-like bosses 32 and 34, passage of light through the blades is restricted to registration of the apertures 14 and 16.

In the embodiment of FIGS. 1 and 2, the linear drive motor system 30 includes a pair of bobbins 36 and 38 connected directly by the strands 26 and 28 to the free ends 22 and 24 of the belt flights defining shutter blades 10 and 12, respectively. The bobbins 36 and 38, which are in the nature of a cylindrical matrix of synthetic resinous material, each carry an electrically conductive coil 40 and 42 and are movable linearly on armatures 44 and 46, respectively. The armatures 44 and 46 are defined as parallel interior legs in an iron or otherwise magnetically permeable fixed frame 48 which, in addition to the armature legs 44 and 46, includes a central leg 50, a pair of outer legs 52 and 54 parallel to the armatures and the central leg 50, and a pair of transverse end frame portions 56 and 58 interconnecting and supporting the defined parallel legs.

Each of the armatures 44 and 46 includes a pair of permanent magnets 60 and 62 spaced by an iron core 64 defined as a portion of the iron frame leg constituting the respective armatures. Also, it will be noted that the magnets in both armatures are arranged so that common poles are adjacent opposite ends of the core 64 and that the polarity of the magnets in the respective armatures 44 and 46 are reversed; that is, with the north poles of the magnets in the armature 44 facing each other and the south poles of the magnets in the armature 46 facing each other. This arrangement, together with the closed or continuous flux path provided by the frame 48, provides a magnetic flux field of high density and at right angles to the axis of the armatures 44 and 46 and the coils 40 and 42. Thus, it should be understood that the frame 48 comprises a closed magnetic loop made up of permanent magnets and magnetically permeable material. Also, the end portions 56 and 58 of the frame 48 serve as abutment stops limiting the throw or distance of reciprocal travel permitted each bobbin 36 and 38.

In operation, assuming the several components to be positioned as shown in FIGS. 1 and 2 of the drawings initially, the blades 10 and 12 are moved to the full open position by energizing the coil 42 to cause the bobbin 38 to move the length of the armature 46 until the end portion 58 of the frame is engaged. Such movement will pull the cord 28 and blade 12 from the position illustrated in FIG. 1 to the right. Simultaneously, the blade 10 will be moved to the left carrying with it the strand 26 and the bobbin 36, the coil 40 of which is de-energized at this time. Closing movement is similarly effected by energizing the coil 40 and de-energizing the coil 42. The blades and bobbins will be correspondingly moved in the opposite direction or back to the initial closed condition of the blades 10 and 12.

Although the operation described assumes movement of the blades 10 and 12 between a fully closed and a fully open condition, any intermediate movement of the blades 10 and 12 may be effected by switching the energized state of the respective coils 40 and 42 using appropriate electronic switching circuitry (not shown). In addition, the speed to which the blades and the bobbins may be accelerated from rest may be regulated very simply by modifying the current in the circuit (not shown) including the coils 40 and 42. In other words, the electromagnetic force exerted by energization of either of the coils 40 and 42 will vary directly in proportion with the current (I) where the flux density (B) and the length (L) of the wire in the flux path remain constant as is the case with the motor system 30 illustrated in the drawings.

As mentioned above, the thickness of the belt flights defining the shutter blades 10 and 12 may be as little as 25 microns with the result that the weight of each blade may be kept as low as 50 milligrams or less than ⅓ of the weight of existing blades. Although a film having such dimensions is not likely to have sufficient resistance to bending to maintain a planar conformation, the arrangement of the bobbins 36 and 38 together with the connection of the blades 10 and 12 by the belt portion 18 about the idler roller 20, enables both blades to be maintained under a light tensile force at all times. Hence, the linear and planar conformation of both blades may be maintained.

Figure 3:
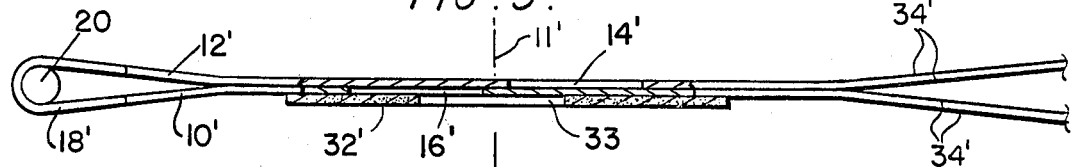
FIG. 3 is a top view patially in cross section similar to FIG. 2, but showing an alternative embodiment of the invention.

In FIG. 3, an alternative arrangement having shutter blades 10' and 12' with apertures 14' and 16' is shown with the blades in light sealing contact with each other. In this instance, a permanent magnet strip or plate 32' adjoins, or is positioned alongside, the flight path of the blade belts and the belts themselves are made of, or coated with, a layer 34' of soft magnetically permeable material; for example, the layer 34 may be a one mil strip of iron or other ferromagnetic material affixed to the full length of, or at least central portions of a plastic belt, or a coating of ferromagnetic material such as a suspension of ferrite or other magnetic oxides applied to appropriate portions of the belt. The belt flight portions 10' and 12' are thus drawn against the magnetic plate 32' and consequently into light sealing contact with each other. To provide a suitable light path for the taking axis of the shutter assembly, the plate 32 is constructed as a pair of strips mounted alongside the taking axis or as a full plate having a central opening 33 as illustrated in FIG. 3. Advantageously, the arrangement of soft magnetic belt flights also maintains their critical portions at the taking axis in the plane defined by the belt adjoining surface of plate 32'. It is contemplated that other arrangements may also be used for the light seal such as retaining the blades 10 and 12 in contact with each other by peripheral guide rails or by guide rollers.

Figure 4:
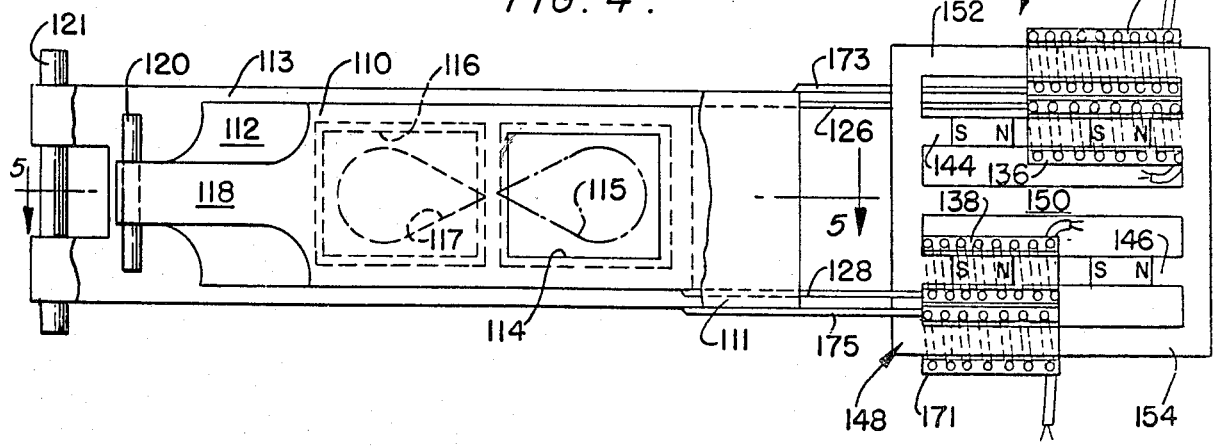
FIG. 4 is a partially cut away front elevation of an alternative embodiment of the system illustrated in FIG. 1.
Figure 5:
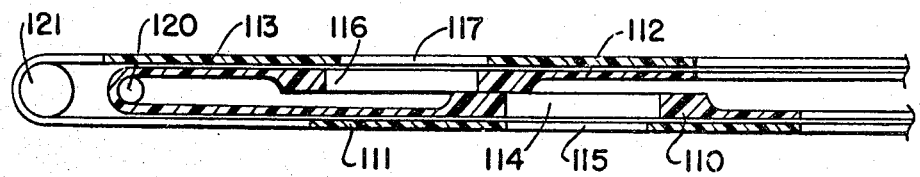
FIG. 5 is a fragmentary cross-section on line 5—5 of FIG. 4.

In FIGS. 4 and 5 of the drawings, an alternative embodiment is shown which is similar in basic respects to the embodiment of FIGS. 1 and 2 except that in this instance, a light controlling blade system is provided in which separate blade mechanisms are provided for controlling shutter actuation and aperture stop movement. Thus, a pair of shutter blades 110 and 112, again defined by opposed flights a double-ended belt having a central portion 118 trained about an idler roller 120, are provided with rectangular openings 114 and 116 illustrated in a closed condition in which the openings are out of registration. A second blade system is defined by flights 111 and 113 of an outer double-ended belt trained about an idler roller 121 of somewhat increased diameter relative to guide roller 120. The belt flights 111 and 113 are provided with tear-shaped apertures 115 and 117 which, when moved into registration with each other, will define openings of progressively increasing size depending on the extent of such movement. This particular arrangement for defining an adjustable aperture stop is exemplary of any aperture stop system which may include, for example, the conventional arrangement of iris blades or the like in which a rotary actuator may be connected at diametrically opposite points to tensile strands (not shown).

The linear motor system 130 for driving the blade system illustrated in FIGS. 4 and 5 is similar to the linear motor drive system 30 of the previously described embodiment in the sense that the ends of the shutter blades 110 and 112 are connected by strands 126 and 128 to bobbins 136 and 138 movable on armature 144 and 146 constituted as interior legs of a closed iron or magnetically permeable frame 148. Thus, operation of the bobbins 136 and 138 to move the shutter blades 110 and 112 between closed and open conditions is essentially identical to that described above in reference to FIGS. 1 and 2.

In the embodiment of FIG. 4, the outer legs 152 and 154 of the frame 148 are fitted with coil carrying bobbins 169 and 171, respectively. The bobbins 169 and 171 are connected by tensile strands 173 and 175 to the opposite free ends of the belt flights 111 and 113 which define the aperture stop of the camera. Thus, by alternate energization of the bobbins 169 and 171, it will be seen that the belt flights 111 and 113 are moved in opposite directions relative to one another in essentially the same manner as the shutter blades as described. Since only one-half of the coils in the bobbins 169 and 171 lie in a flux path formed between two legs of the frame, i.e., between the armatures 152 and 144 and 154 and 146, the electromagnetic force causing movement of the bobbins 169 and 171 and their associated components is approximately half that of the force with which the bobbins 136 and 138 are driven. The force requirements for an auxiliary function such as aperture stop setting, are significantly less than the forces required for high speed shutter operation. Hence, the reduced electromagnetic force in the outside bobbins 169 and 171 is of no consequence. Moreover, it will be noted that the bobbins 169 and 171 are added to the arrangement described with respect to FIGS. 1 and 2 with no appreciable increase in the overall size of the motor drive system 130 as compared with the drive system 30.

Thus it will be seen that as a result of the present invention, a highly effective light controlling blade and drive system is provided by which the principal objective and others are completely fulfilled. It will be apparent to those skilled in the art from the preceding description that modifications and/or changes may be made in the disclosed embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

I claim:

1. A light controlling blade and drive system for photographic apparatus, said system comprising:
    a pair of apertured opaque blades defined by linear flights of a belt having a central bight portion trained about a fixed axis;
    linear motor drive means including a fixed frame spaced from said axis, a pair of electromagnetic force driven movable members supported by said frame for reciprocation alternately in opposite directions; and
    tensile means connecting said movable members to said blades for drawing said blades in opposite directions responsive to movement of said movable members.

2. The apparatus of claim 1 wherein said frame comprises a closed magnetic loop of permanent magnets and magnetically permeable material, and said electromagnetic force driven members comprise conductive coil supporting bobbins movable in relation to permanent magnet armatures fixed in said frame.

3. The apparatus of claim 2 wherein said armatures are parallel legs each including permanent magnets and having opposite ends connected by magnetically permeable transverse end portions of said frame, and each of said coil supporting bobbins are mounted with its coil encompassing one of said armatures respectively.

4. The apparatus of claim 3 wherein each of said armatures includes two aligned permanent magnets spaced by a magnetically permeable core, the common poles of said two magnets being adjacent opposite ends of said core.

5. The apparatus of claim 4 wherein said frame is magnetically permeable and includes a central leg and two outer legs of magnetically permeable material extending between said transverse end portions, each of said armatures being parallel to and positioned between said central leg and one of said outer legs.

6. The apparatus of claim 5 wherein said motor drive means includes a further pair of movable coil supporting bobbins encompassing said two outer legs for driving auxiliary components.

7. The apparatus of claim 6 including a second pair of blades defined by linear flights of a belt having a central portion trained about a fixed axis, and tensile means connecting said further pair of bobbins to said second blades for drawing said second pair of blades in opposite directions responsive to movement of said further pair of bobbins.

8. The apparatus of claim 7 wherein said pair of apertured opaque blades are cooperative as shutter blades and wherein said second set of blades are cooperative as a variable aperture stop.

9. The apparatus of claim 1 wherein said belt defining blade is a polyester film having a thickness on the order of 25 microns.

10. The apparatus of claim 1 including apertured frame bosses on the mutually facing surfaces of said blades to serve as a light seal.

11. The apparatus of claim 1 wherein said blades are maintained in light sealing contact by magnetic force.

12. The apparatus of claim 11 wherein said belt carries a layer of magnetically permeable material, and said apparatus additionally includes a permanent magnet located between said drive means and said fixed axis in adjoining relation to said linear flights of said belt so as to draw said flights against each other and said permanent magnet to provide said light sealing contact.

13. An exposure control, blade system for photographic apparatus for controlling light passed along a given optical axis to a focal plane in said apparatus, said system comprising:
 a permanent magnet arrangement mounted in adjoining relation to said given axis and defining a blade support surface generally normal to said axis;
 a blade arrangement comprising a pair of apertured thin blade sections of light blocking material mounted on said support surface in overlying relation to each other at said optical axis, said sections being comprised in part of soft magnetically permeable material so as to be drawn against said support surface; and
 drive means for producing relative motion between said sections over said magnet arrangement so as to displace the apertures of said sections between a light transmitting condition wherein said apertures are in at least partial coincidence at said axis and a light blocking condition wherein said apertures are out of alignment at said axis whereby said blade sections are maintained in light sealing contact with each other by said magnet arrangement.

14. The system of claim 13 wherein at least said blade sections are comprised of relatively flexible material.

15. The system of claim 13 wherein said blade arrangement is comprised of a belt of thin flexible material having a central bight portion trained about a fixed axis and with said apertured sections being defined by overlapping portions of said belt, and said drive means includes at least one force driven movable member and tensile means coupling one end of said belt to said movable member for drawing said apertured sections in opposite directions responsive to movement of said movable member.

* * * * *